April 4, 1950 W. SHOCKLEY 2,502,488
SEMICONDUCTOR AMPLIFIER
Filed Sept. 24, 1948
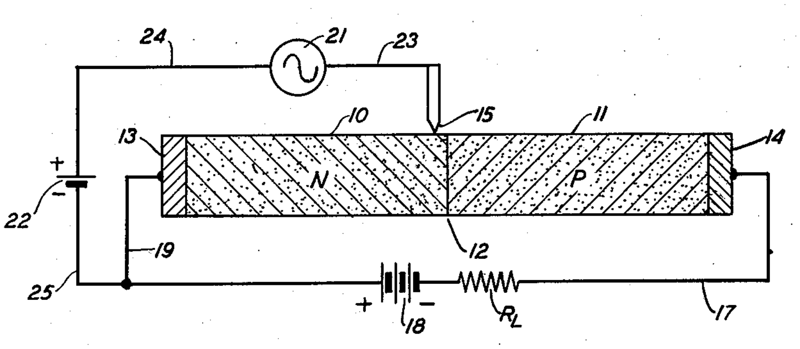
INVENTOR
W. SHOCKLEY
BY [signature]
ATTORNEY Patented Apr. 4, 1950 2,502,488

UNITED STATES PATENT OFFICE 2,502,488

SEMICONDUCTOR AMPLIFIER

William Shockley, Madison, N. J., assignor to Bell Telephone Laboratories, Incorporated, New York, N. Y., a corporation of New York Application September 24, 1948, Serial No. 50,895

9 Claims. (Cl. 179—171)

This invention relates to means for and methods of translating or controlling electrical signals and more particularly to circuit elements utilizing semiconductors and to systems including such elements.

One general object of this invention is to provide new and improved means for and methods of translating and controlling, for example amplifying, generating, modulating, etc., electric signals.

Another general object of this invention is to enable the efficient, expeditious and economic translation or control of electrical energy.

In accordance with one broad feature of this invention, translation and control of electric signals is effected by alteration or regulation of the conduction characteristics of a semiconductive body. More specifically, in accordance with one broad feature of this invention, such translation and control is effected by control of the characteristics, for example the impedance, of a layer or barrier intermediate the two portions of a semiconductive body in such a manner as to alter advantageously the flow of current between the two portions.

One feature of this invention relates to the control of current flow through a semiconductive body by means of carriers of charge of opposite sign to the carriers which convey the current through the body.

Another feature of this invention relates to a body of semiconductive material, means for making electrical connection respectively to two portions of said body, means for making a third electrical connection to another portion of the body intermediate the first two portions, and circuit means including power sources whereby the influence of the third connection may be made to control the flow of current between the other connections.

A further feature of this invention resides in a body of semiconductive material comprising two zones of material of opposite conductivity type separated by a barrier, means for making external electrical connections respectively to each zone and means for making a third connection to one of the zones adjacent the barrier for controlling the flow of current between the other two connections.

Another feature of this invention involves a semiconductive body which may be used for voltage and power amplification when associated with means for introducing mobile carriers of charge to the body at relatively low voltage and extracting like carriers at a relatively high voltage.

Other objects and features of this invention will appear more fully and clearly from the following description of illustrative embodiments thereof taken in connection with the appended drawings in which:

The single figure shows in section a device suitable for practicing the invention, in connection with an appropriate circuit.

The device of this invention is in some respects like devices illustrated and described in the application of W. Shockley Serial No. 35,423 filed June 26, 1948. Reference is made to said application for a general description and discussion of pertinent principles, suitable materials and certain terms which may be employed in the description and claiming of this invention.

The terms N-type and P-type are applied to semiconductive materials which tend to pass current easily when the material is respectively negative or positive with respect to a conductive contact thereto and with difficulty when the reverse is true, and which also have consistent Hall and thermoelectric effects.

The conductivity type (either N- or P-type) of a semiconductor may be determined in one way by minute quantities of significant impurities as discussed in the previously noted application Serial No. 35,423. Energy relations within the semiconductor may also determine the conductivity type as more fully discussed in the application of J. Bardeen and W. H. Brattain Serial No. 33,466 filed June 17, 1948.

The term "barrier" or "electrical barrier" used in the description and discussion of the device of this invention is applied to a high resistance interfacial condition between contacting semiconductors of respectively opposite conductivity type or between a semiconductor and a metallic conductor whereby current passes with relative ease in one direction and with relative difficulty in the other.

The device shown in the figure comprises a body or block of semiconductive material, for example germanium, containing significant impurities. The block comprises two zones 10 and 11 respectively of N- and P-type materials separated by the barrier 12. The opposite ends of the block are provided with relatively large area connections 13 and 14 respectively, which may be metallic coatings such as solder, vapor deposited metal coatings, electroplated metal coatings or the like.

Means for making connection to one of the zones closely adjacent to the barrier 12 may comprise a point contact 15 bearing on the surface of the block close to the barrier. The contact point may be of tungsten, Phosphor bronze or the like.

Conductor 17 leads from connection 14 to a load $R_L$ and thence through a power source, such as a battery 18, and back through conductor 19 to the body at connection 13. A source 21 of signal voltage and a biasing source 22 are connected from the contact 15 adjacent the barrier to connection 13 by conductors 23, 24, 25 and 19. With N and P zones as shown, the negative pole of source 18 is connected to the P zone and the positive pole to the N zone. The positive pole of biasing source 22 is connected to the contact 15 in order that current may be easily introduced to the N-type material at this point.

With the device and circuit as shown the connections 13, 14 and 15 may be called the base, collector and emitter respectively in accordance with nomenclature which has been applied to devices of this type. The circuit between the base 13 and the emitter 15 then is the input circuit and that between the base 13 and the collector 14 is the output circuit. The battery 18 in the output circuit may have a voltage of the order of 10 to 100 volts and the bias 22 in the input circuit may be of the order of 0:1 to 1:0 volt.

The current introduced to the N zone at the point contact 15 comprises "holes" as more fully discussed in application Serial No. 35,423 to which reference has been made heretofore. The "holes" injected from the point 15 will diffuse in the N-type material and if they approach the N—P junction they will be drawn across into the P region by the field existing there. Under the conditions of operating bias, there is a steady small current across the junction and this enhances the natural field so that the "holes" entering the N region will tend to be pulled toward the junction by the biasing field produced by the battery. For this reason if the "holes" are injected within a few mils of the junction, they will substantially all be drawn across the barrier into the P region. Consequently, substantially all of the injected current which consists of "holes" will flow into the P region.

Since the point 15 is operated in the forward direction or direction of easy current flow, it has relatively low input impedance. On the other hand, the N—P junction has relatively high impedance so that there is power gain across the device in the usual way as discussed in the previous application Serial No. 35,423.

If a contact such as 15 is made so that it will inject electrons, it should be placed on the P side of the barrier and the device operated with the input and output circuits interchanged and with all of the polarities reversed. Other semiconductive materials than germanium may be used so long as high impedance N—P junctions are obtained and so long as the point injects carriers of the sign not normally present in the region to which it makes contact.

It is to be understood that the specific embodiments of the invention shown and described are but illustrative and that various modifications may be made therein without departing from the scope and spirit of this invention.

What is claimed is:

1. A translating device comprising a body of semiconductive material having zones of opposite conductivity type separated by a barrier, an ohmic connection to each zone remote from the barrier, and a rectifying contact on one zone closely adjacent to the barrier.

2. A translating device comprising a body of germanium material having zones of opposite conductivity type separated by a barrier, an ohmic connection to each zone remote from the barrier, and a metallic rectifying point on one of said zones closely adjacent to the barrier.

3. A translating device comprising a body of semiconductive material having zones of N- and P-type material separated by a barrier, an ohmic connection to each zone remote from the barrier, and a metallic rectifying point on the N-type zone closely adjacent to the barrier.

4. A translating device comprising a body of germanium material having zones of N- and P-type material separated by a barrier, an ohmic connection to each zone remote from the barrier, and a metallic rectifying point on the P-type zone closely adjacent to the barrier.

5. An amplifier comprising a body of semiconductive material having zones of opposite conductivity type separated by a barrier, a base connection to one zone remote from the barrier, means for introducing current to said one zone including a rectifying contact closely adjacent to the barrier and a source of relatively low voltage between the base connection and the rectifying contact, said voltage poled in the direction of easy current flow into said one zone, and means for extracting current from the other zone including an ohmic connection and a source of relatively high voltage between the base connection and the ohmic connection, said voltage poled in the direction of difficult current flow through said barrier.

6. An amplifier comprising a body of germanium material having zones of N- and P-type material separated by a barrier, an input circuit including a source of relatively low voltage, a rectifying point on the surface of the N-type zone closely adjacent the barrier, and an ohmic base connection to the same zone remote from the barrier, and an output circuit including a source of relatively high voltage, an ohmic connection to the P-type zone remote from the barrier and the base connection.

7. A translating device comprising a body of semiconductive material having zones of opposite conductivity type separated by a barrier, means for introducing current at low impedance into one of said zones including a metallic rectifier point on the surface of said one zone closely adjacent said barrier, and means for extracting current from the other zone comprising an ohmic connection to said other zone remote from said barrier.

8. A circuit element comprising a slab of semiconductive material having zones of opposite conductivity type separated by a barrier intermediate its end, a large area ohmic connection to each end of the slab, and a metallic point contact on the surface of one of said zones closely adjacent to said barrier.

9. A translating device comprising a body of semiconductive material having zones of opposite conductivity type separated by a barrier, means for introducing at low impedance to one of said zones current carriers of opposite sign to those normally found in said zone including a metallic rectifier point on the surface of said zone closely adjacent said barrier, and means for extracting current from said other zone comprising an ohmic connection to said zone remote from said barrier.

WILLIAM SHOCKLEY.

No references cited.